United States Patent [19]

Taylor

[11] Patent Number: 5,460,021
[45] Date of Patent: Oct. 24, 1995

[54] GOLF CAR SECURITY APPARATUSES

[76] Inventor: Martin B. Taylor, 6 Cedar Key Way, Leesburg, Fla. 34788

[21] Appl. No.: 240,168

[22] Filed: May 9, 1994

[51] Int. Cl.⁶ .................................................. B60R 25/02
[52] U.S. Cl. ............................. 70/209; 70/226; 70/238; 188/32; 297/217.1
[58] Field of Search ................ 70/209, 211, 212, 70/261, 225, 226, 237, 238, 239; 297/217.1, 463.1, 463.2; 188/32, 4 R; 180/287

[56] References Cited

U.S. PATENT DOCUMENTS

| | | | |
|---|---|---|---|
| D. 339,974 | 10/1993 | Wilcox | D8/343 |
| 472,997 | 4/1892 | Hayward | 188/32 |
| 2,461,248 | 2/1949 | Wright | 188/32 |
| 3,348,391 | 10/1967 | Barnwell | 70/211 |
| 3,828,590 | 8/1974 | Thiebault | 70/225 X |
| 4,103,524 | 8/1978 | Mitchell et al. | 70/209 |
| 4,304,110 | 12/1981 | Fain | 70/209 |
| 4,441,586 | 4/1984 | Bernier | 70/225 X |
| 5,024,069 | 6/1991 | Hull, Jr. et al. | 70/209 |
| 5,028,086 | 7/1991 | Smith | 297/217.1 X |
| 5,121,617 | 6/1992 | Chen | 70/209 |
| 5,157,951 | 10/1992 | Chen et al. | 70/209 |
| 5,212,973 | 5/1993 | van Staden et al. | 70/209 |
| 5,239,849 | 8/1993 | Gallardo | 70/209 |
| 5,251,465 | 10/1993 | Hwang | 70/209 |
| 5,263,553 | 11/1993 | Duncan | 70/226 X |
| 5,277,043 | 1/1994 | Inashvili | 70/238 |

FOREIGN PATENT DOCUMENTS

| | | | |
|---|---|---|---|
| 521946 | 7/1921 | France | 70/212 |
| 513332 | 11/1930 | Germany | 70/211 |
| 2248593 | 4/1992 | United Kingdom | 70/209 |
| WO90/09911 | 9/1990 | WIPO | 70/238 |

*Primary Examiner*—Lloyd A. Gall
*Attorney, Agent, or Firm*—Edward M. Livingston

[57] ABSTRACT

Golf car locking apparatuses having a restraining member (1) positioned on a seat (2) of a golf car (3) to prevent access to power-storage batteries (4) and extended from a seat upright member (5) behind the seat (2) and an attached member (7) extending from the seat restraining member (1) to a locking position on a steering wheel (8). Wheel-locking structure is provided optionally in addition with a wheel-lock clamp (9).

33 Claims, 6 Drawing Sheets

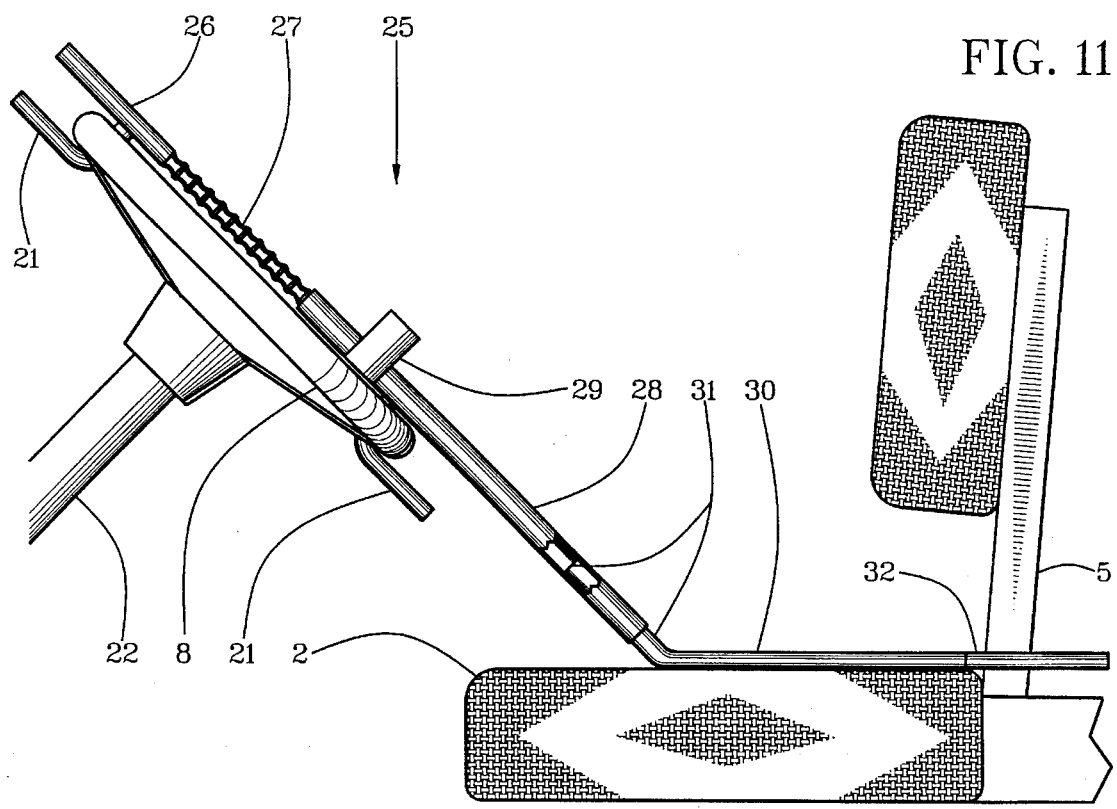
FIG. 11
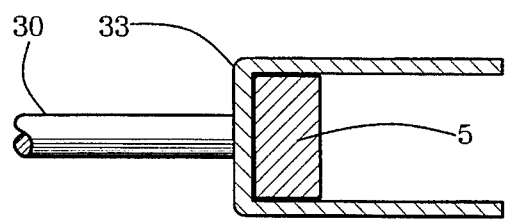
FIG. 12
FIG. 13
FIG. 14
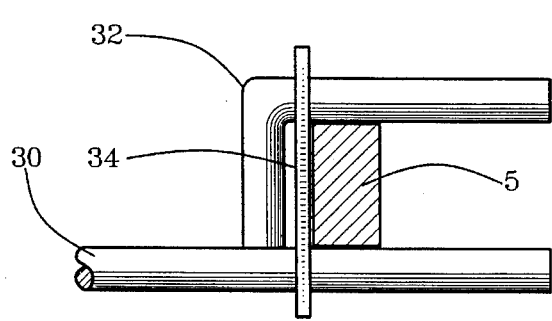
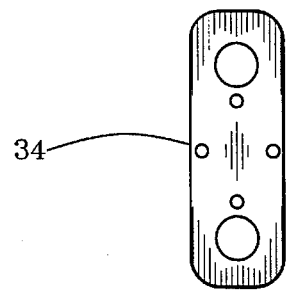

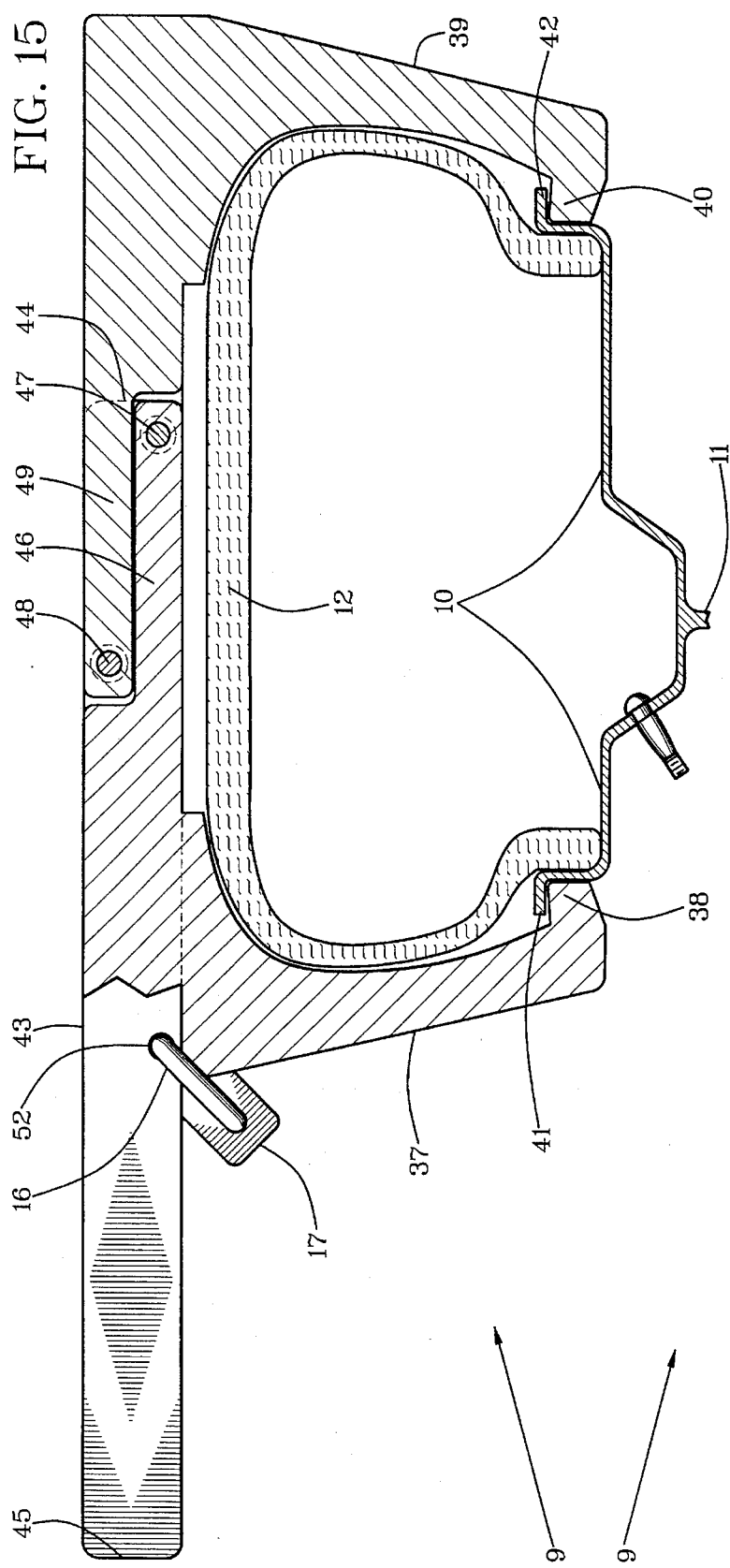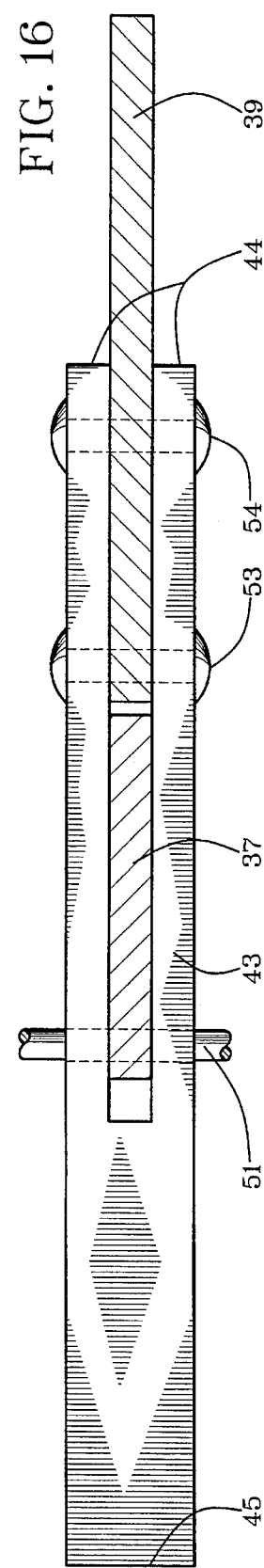

5,460,021

GOLF CAR SECURITY APPARATUSES

BACKGROUND OF THE INVENTION

This invention relates to locks for golf cars and other vehicles not having lockable doors and other locking means.

Previously, golf cars have been almost unprotected against theft unless locked in a building. Steering-wheel locks have been devised for cars but not adequately for golf cars which have too much open space for such rods to be attachable to steering wheels as locks. Also, large power-storage batteries, wiring and other items under seats of golf cars have been relatively unprotected against larceny. Many golf courses to provide some measure of security use chains and locks stretched over the golf cars and through the steering wheels. Unfortunately, removing the chains scrapes and damages the golf cars and still leaves the batteries unprotected from theft. Examples of mere steering-wheel-lock rods are described in U.S. Pat. No. 5,157,951 granted to Chen, et al., issued Oct. 27, 1992; U.S. Pat. No. 5,212,973 granted to van Staden, et al. issued May 25 1993; U.S. Pat. No. 5,239,849 granted to Gallardo, issued Aug. 31, 1993; U.S. Pat. No. 5,121,617 granted to Chen, issued Jun. 16, 1992; U.S. Pat. No. 5,024,069 granted to Hull, Jr., et al., issued Jun. 18, 1991; U.S. Pat. No. 4,103,524 granted to Mitchell, et al., issued Aug. 1, 1978; U.S. Pat. No. 4,304,110 granted to Fain, issued Dec. 8, 1981; and DES 339,974 granted to Wilcox, issued Oct. 5, 1993. No security apparatuses like the present invention exists in the prior patented or commercialized art.

SUMMARY OF THE INVENTION

In light of problems that have existed and that continue to exist in this field, objectives of this invention are to provide golf-car locking devices which:

Protect against theft of the golf car by preventing rotation of a steering wheel of a golf car;

Protect against removal of power-storage batteries and wiring from golf cars; and Protect against turning of one or more wheels of a golf car.

This invention accomplishes the above and other objectives with a restraining member positioned on a seat of a golf car to prevent access to power-storage batteries and extended from a seat upright member behind the seat and attached member extended from the restraining member to a locking position on a steering wheel. Wheel-locking means are provided optionally in addition.

BRIEF DESCRIPTION OF THE DRAWINGS

This invention is described by appended claims in relation to a description of the preferred embodiments with reference to the following drawings which are described briefly as follows:

FIG. 11 is a side view of the FIG. 10 illustration;

FIG. 12 is a sectional top view of a seat-back attachment for either embodiment;

FIG. 13 is a sectional top view of a seat-back attachment particularly constructed for the embodiment with a telescopic rod for attachment to steering wheels;

FIG. 14 is a top view of a seat-back plate for being positioned between a seat-back support and a seat-back attachment.

FIG. 15 is a partially cutaway front view of a wheel-lock clamp attached to and padlocked onto a rim of a golf-car wheel;

FIG. 16 is a top view of the FIG. 15 illustration with a lock pin representative of a padlock shackle or other locking means.

DESCRIPTION OF PREFERRED EMBODIMENTS

Figure 1:
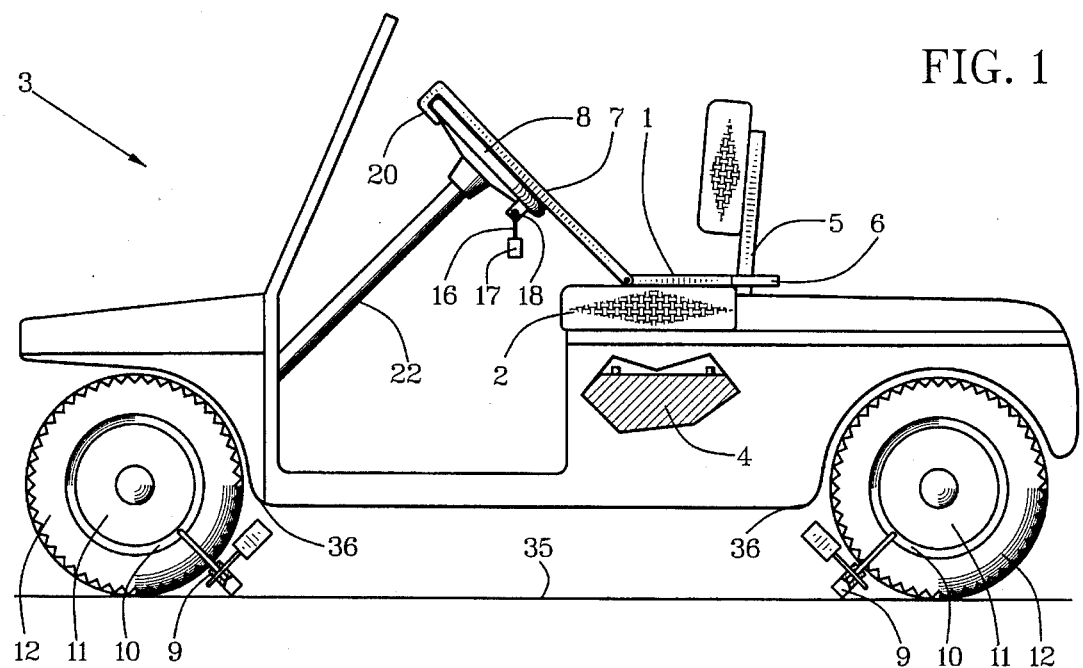
FIG. 1 is a side elevation view of this invention attached to a golf car with a sectional cutaway showing a position of batteries being protected under seats of the golf car.

Reference is made first to FIG. 1. A seat restraint 1 is positioned on a seat 2 of golf car 3 to prevent lifting of the seat 2 for unauthorized access to a battery 4 and other valuables such as wiring under the seat 2. The seat restraint 1 is attached to a seat-back support 5 with a bifurcated extension 6 of the seat restraint 1 at a rear portion of the seat 2. At a forward portion of the seat 2, the seat restraint 1 is attached to a steering-wheel attachment 7 that is attachable to a steering wheel 8 of the golf car 3. A wheel-lock clamp 9 is attachable to a rim 10 of a wheel 11 and extended radially from a position at an outside periphery of a tire 12 of one or more wheels 11 of the golf car 3. In this manner the golf car 3 is protected against turning of its steering wheel 8, against removal of its expensive storage batteries 4 and against rotation of its wheels 11 by being pushed or towed.

Referring to FIGS. 1–5, the steering-wheel attachment 7 can be a bifurcated rod 13 with a spoke bifurcation 14 extended laterally from a side of a steel rod for fitting on opposite sides of a steering-wheel spoke 15. With the spoke bifurcation 14 positioned on both sides of the steering wheel 8, a padlock shackle 16 of a padlock 17 is inserted into lock apertures 18 at an opposite side of the steering-wheel spoke 15 from the bifurcated rod 13.

Figure 2:
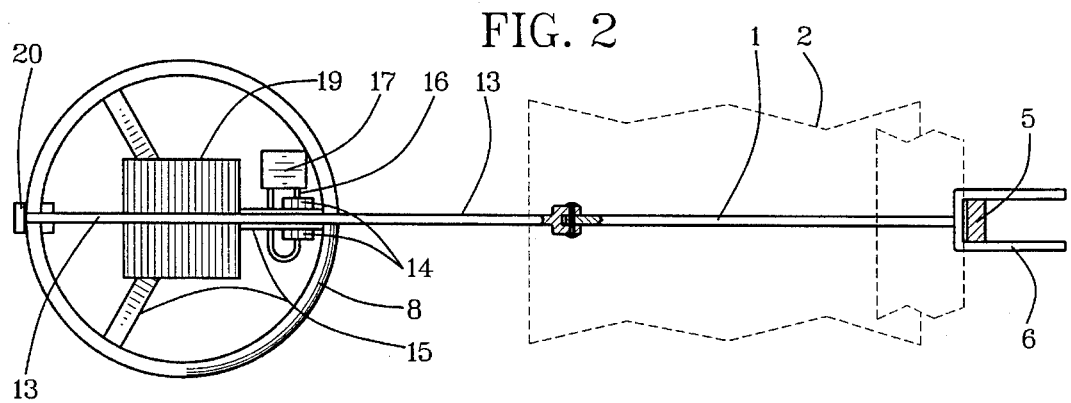
FIG. 2 is a sectional top view of an embodiment with a bifurcated rod locked to a steering wheel.
Figure 3:
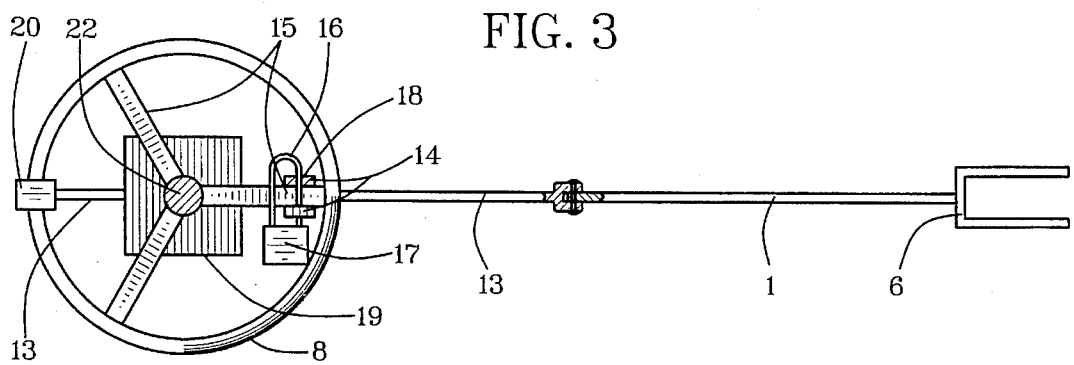
FIG. 3 is a sectional bottom view of the FIG. 2 illustration.
Figure 4:
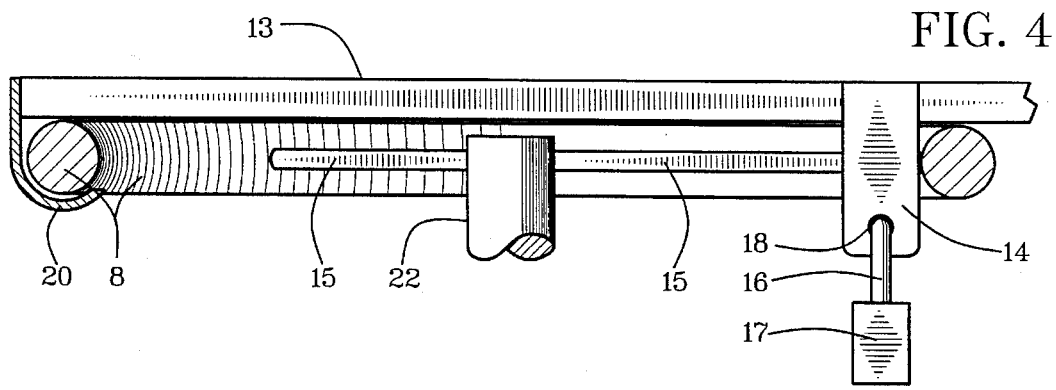
FIG. 4 is a cutaway sectional side view of the bifurcated rod having an inward hook and attached to a steering wheel with a padlock.
Figure 5:
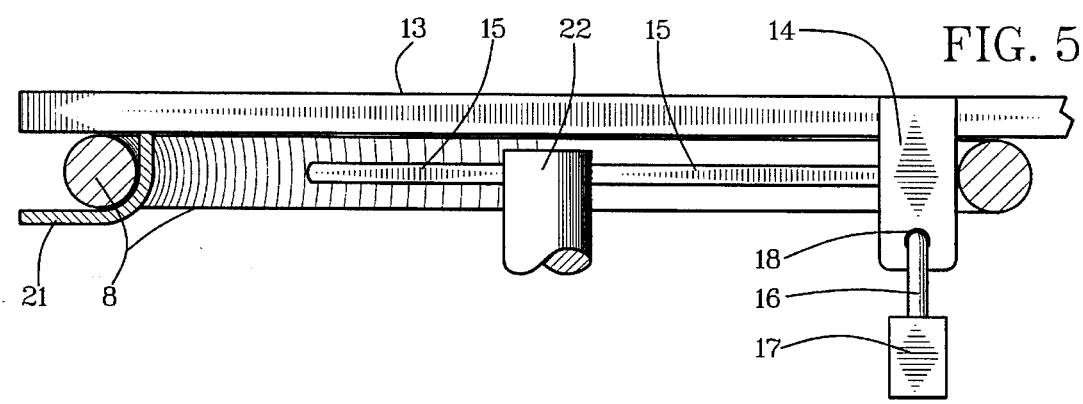
FIG. 5 is a cutaway sectional side view of the bifurcated rod having an outward hook and attached to a steering wheel with a padlock.

In the FIG. 2 top view, the bifurcated rod 13 is shown on top of a score card 19 that is positioned usually on a center of a golf-car steering wheel 8. The score card 19 is shown under the steering wheel 8 in the bottom view FIG. 3. In FIGS. 2–3, opposite sides of the spoke bifurcation 14 are shown on opposite sides of a steering-wheel spoke 15. In FIGS. 4–5, one side of the spoke bifurcation 14 is shown on one side of a steering-wheel spoke 15.

Steering-wheel hooks can be extended inwardly or outwardly from different types of steering-wheel attachments 7. In FIGS. 1–4, an inward steering-wheel hook 20 is extended inwardly from a distal end of the bifurcated rod 13. In FIG. 5, an outward steering-wheel hook 21 is shown extended outwardly from a position near the distal end of the bifurcated rod 13.

Different embodiments of the steering-wheel attachments 7 can be attached variously to the seat restraints 1. In FIGS. 1–3, the bifurcated rod 13 as a form of steering-wheel attachment 7 is shown attached pivotally to the seat restraint 1. In FIG. 1, a single-side pivotal attachment of the steering-wheel attachment 7 to the seat restraint 1 is shown. In FIGS. 2–3, a bifurcate pivotal attachment of the bifurcated rod 13 to the seat restraint 1 is shown. Telescopic and various forms of rigid fastener means can be employed also.

In FIGS. 2–5, the steering-wheel spokes 15 are shown extended in a "Y" formation from a steering rod 22. In FIG. 1, a steering-wheel attachment 7 is shown without particular positioning of the steering-wheel attachment 7 in relation to the steering-wheel spokes 15. This is representative of forms of steering-wheel attachments 7 which are attachable between or which are attachable directly to the steering-wheel spokes 15.

Figure 6:
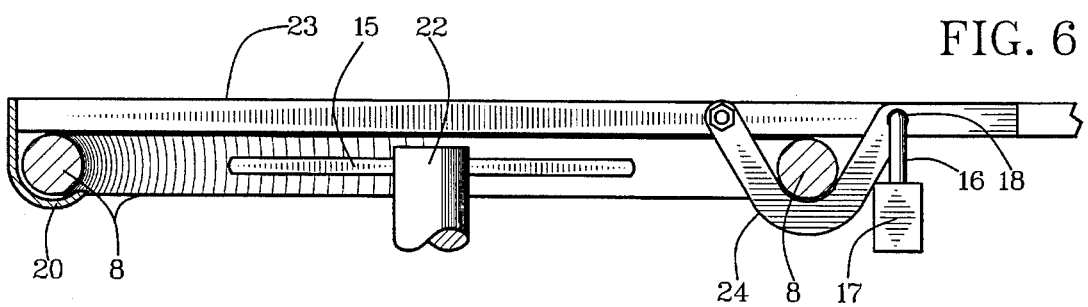
FIG. 6 is a cutaway sectional side view of an embodiment with a clamp rod having an outward hook and attached to a steering wheel with a padlock.
Figure 7:
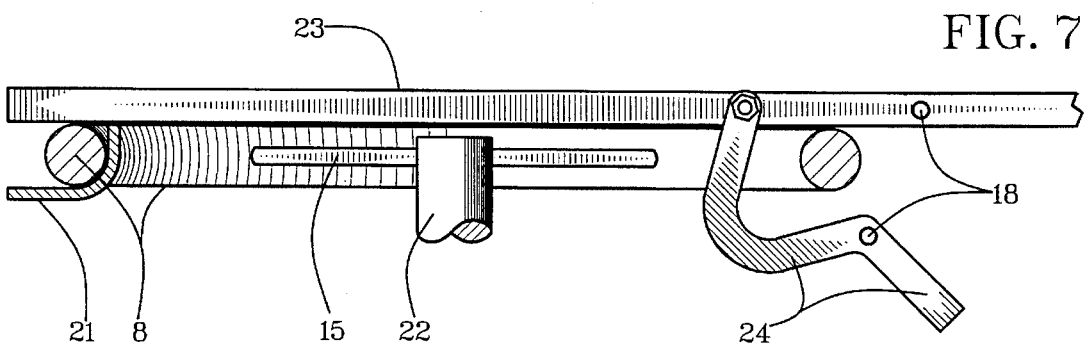
FIG. 7 is a cutaway sectional side view of the FIG. 6 embodiment with a clamp rod having an outward hook and with an attachment clamp in open mode unlocked on a steering wheel.
Figure 8:
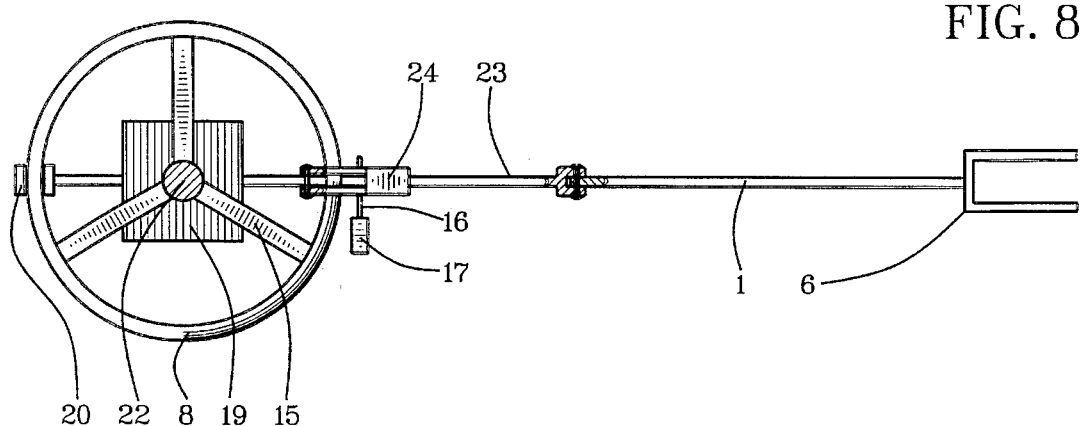
FIG. 8 is a bottom view of the FIG. 6 embodiment having a seat-back attachment extended pivotally.
Figure 9:
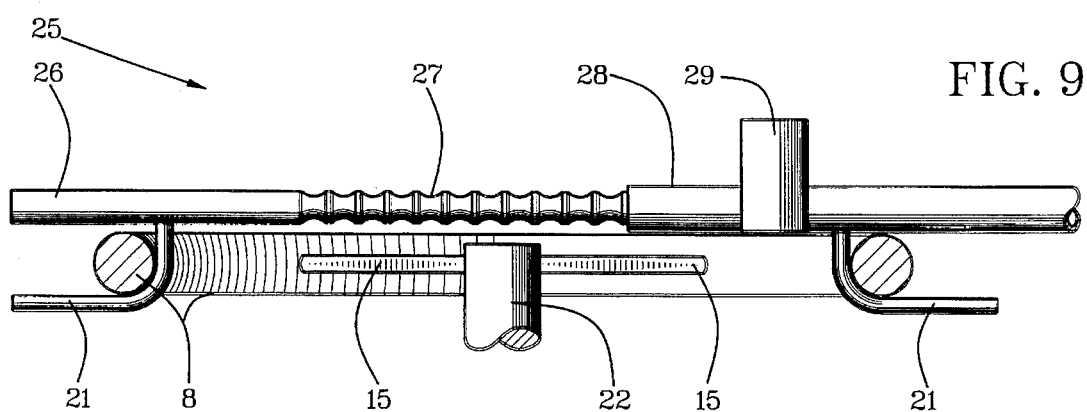
FIG. 9 is a cutaway sectional side view of an embodiment with a telescopic rod attached to a steering wheel.

Referring to FIGS. 6–8, a clamp rod 23 is illustrated as an optional form of steering-wheel attachment 7. A clamp jaw 24 is attached pivotally to the clamp rod 23 at a position opposite a circumferential section of the steering wheel 8 from a padlock aperture 18. The clamp jaw 24 is angled and/or curved to fit around the circumferential section of the steering wheel 8 at a position between the steering-wheel spokes 15 in a locked mode with a padlock shackle 16 inserted in matching padlock apertures 18 in the clamp jaw 24 and in the clamp rod 23. As for the bifurcated rod 13 described in relation to FIGS. 1–5, the clamp rod 23 can be attached variously to the seat restraint 1.

Referring to FIGS. 9–14, a telescopic rod 25 can be employed as an alternative steering-wheel attachment 7. The telescopic rod 25 can be a combination of any of a variety of cylindrical rods 26 having lock indentations 27 in sliding relationship to a lock tube 28 with a lock cylinder 29 that locks onto the lock indentations 27 at desired telescopic lengths. Outward steering-wheel hooks 21 are extended oppositely for engagement with circumferentially opposite sections of the steering wheel 8. As for the clamp rod 23 described in relation to FIGS. 6–8, attachment to the steering wheel 8 is between steering-wheel spokes 15.

Figure 10:
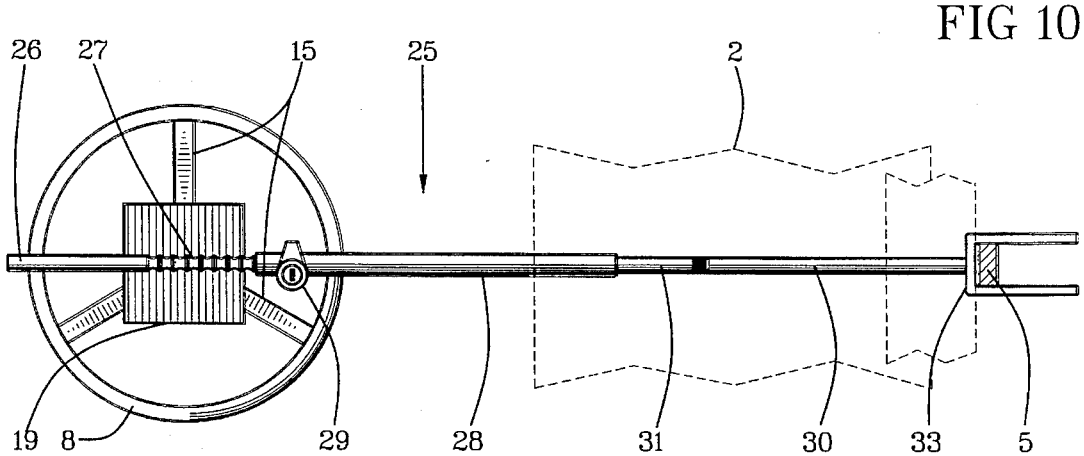
FIG. 10 is a top view of the FIG. 9 embodiment having a seat-back attachment extended telescopically.

Different from either the bifurcated rod 13 or the clamp rod 23, however, preferable attachment of the telescopic rod 25 to the seat restraint 1 is telescopic as a result of tubular construction of lock tube 28. For this embodiment, the seat restraint 1 can be a cylindrical seat restraint 30 having an angular extension 31 that is positioned in the lock tube 28. The bifurcated extension 6 of the seat restraint 1 can be either a cylindrical bifurcate 32 as shown in FIGS. 11 and 13 or a rectangular bifurcate 33 as shown in FIGS. 10 and 12. For the cylindrical bifurcate 32, a back-rest support 34, shown in FIG. 14, can be positioned intermediate the seat-back support 5 and a bifurcation of the cylindrical bifurcate 32.

Referring to FIGS. 1 and 15–17, the wheel-lock clamp 9 that is attachable to the rim 10 of the wheel 11 prevents rotation of the wheel 11 as a result of a block condition in relation to a ground surface 35 and prevention of passage between the tire 12 and an undercarriage 36 of the golf car 3, regardless of whether the tire 12 is inflated. The wheel-lock clamp 9 has an outside clamp jaw 37 with an outside clamp hook 38 and an inside clamp jaw 39 with an inside clamp hook 40. The outside clamp hook 38 is attachable to an underside of an outside rim extension 41 of the wheel rim 10. The inside clamp hook 40 is attachable to an underside of an inside rim extension 42 of the wheel rim 10. A clamp-lock lever 43 has a clamp end 44 and a handle end 45. The clamp end 44 is attached pivotally to an inside end of an outside-jaw step 46 at an inside pivotal position 47 on the inside end of the outside-jaw step 46. At an outside pivotal position 48 on the clamp-lock lever 43, the clamp-lock lever 43 is attached pivotally to an inside end of an inside-jaw step 49 on the inside clamp jaw 39. A jaw-lock aperture 50 sized and shaped to receive a lock pin 51 is provided at a design distance from the inside pivotal position 47 on the outside end of the outside jaw 37. A lever-lock aperture 52 sized and shaped to receive the lock pin 51 is provided at a distance from the clamp end 44 of the clamp-lock lever 43 that positions the lever-lock aperture 52 concentrically with the jaw-lock aperture 50 when the clamp-lock lever 43 is at a design position of circumferential travel in relation to the outside-jaw step 46 for insertion of the lock pin 51 shown in FIG. 16 or for insertion of a padlock shackle 16 of a padlock 17 as shown in FIG. 15.

As shown in FIG. 16, the clamp-lock lever 43 can have two plates juxtaposed with the outside clamp jaw 37 and the inside clamp jaw 39 positioned pivotally between the two juxtaposed plates. The outside clamp jaw 37 can be attached pivotally to the clamp-lock lever 43 with an inside axle 53 that is riveted to the clamp-lock lever 43 at the inside pivotal position 47. The inside clamp jaw 39 can be attached pivotally to the clamp-lock lever 43 with an outside axle 54 that is riveted to the clamp-lock lever 43 at the outside pivotal position 48.

Figure 17:
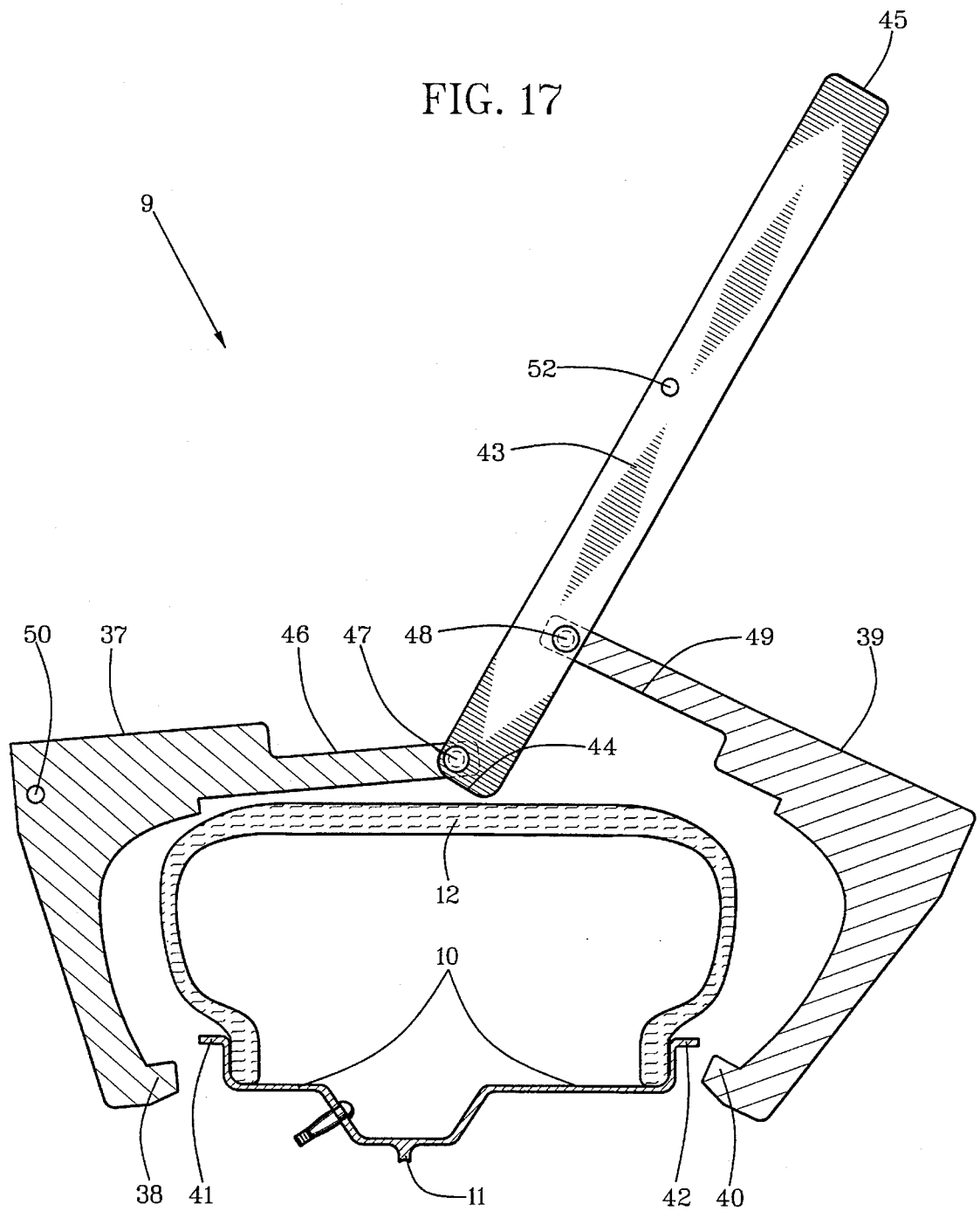
FIG. 17 is a partially cutaway front view of the wheel-lock clamp in an unlocked mode.

To attach the wheel-lock clamp 9 to the rim 10 of the wheel 11, the clamp-lock lever 43 is first pivoted clockwise as shown in FIG. 17 to spread the outside clamp jaw 37 and the inside clamp jaw 39 apart. Then the clamp hooks 38 and 40 are positioned under the rim extensions 41 and 42 respectively. Pivotal direction of the clamp-lock lever 43 is then reversed to counterclockwise to tighten the clamp hooks 38 and 40 onto the rim. Finally, when the jaw-lock aperture 50 and the lever-lock aperture 52 are in-line concentrically, a lock pin 51 such as a padlock shackle 16 is inserted into the apertures 50 and 52.

Although several embodiments of new and useful golf-car security apparatuses have been described hereinabove, all modifications, adaptations, substitutions of equivalents, combinations of parts, applications and forms thereof as described by the following claims are included in this invention.

I claim:

1. A golf-car-security apparatus comprising:

a seat restraint that is positionable on top of a seat of a golf car for preventing the seat from being removed for access to batteries and other items under the seat of the golf car;

a seat-back attachment that is attachable to a seat member at an aft portion of the seat restraint for engaging a portion of a seat back of a golf car;

a steering-wheel attachment that is attachable to a front portion of the seat restraint;

a steering-wheel-attachment means with which the steering-wheel attachment is attachable to a steering wheel of the golf car;

a locking means with which the steering-wheel attachment is lockable onto the steering wheel of the golf car; and a wheel-lock clamp attachable to a rim of at least one wheel and extendible from-side-to-side over a tire on the rim.

2. A golf-car-security apparatus as described in claim 1 wherein the wheel-lock clamp has:

an outside clamp jaw with an outside-jaw step and an outside end;

an inside clamp jaw with an inside-jaw step and outside end;

an outside clamp hook extended from the outside end of the outside clamp jaw with which the wheel-lock clamp is attached to an underside of an outside rim extension of a wheel rim at a select circumferential position on a tire mounted on the wheel rim;

an inside clamp hook extended from the outside end of the inside clamp jaw with which the wheel-lock clamp is attached to an underside of an inside rim extension of a wheel rim at the select circumferential position on a tire mounted on the wheel rim;

a clamp-lock lever having a clamp end of the clamp-lock lever and a handle end of the clamp-lock lever;

the clamp end of the clamp-lock lever is attached pivotally to an inside end of the outside-jaw step at an inside pivotal position on the inside end of the outside-jaw step;

the clamp end of the clamp-lock lever is attached pivotally to an inside end of the inside-jaw step at an outside pivotal position on the inside end of the inside-jaw step;

a jaw-lock aperture sized and shaped to receive a lock pin is provided at a design distance from the inside pivotal position on the inside end of the outside-jaw step; and a lever-lock aperture sized and shaped to receive the lock pin is provided at a distance from the clamp end of the clamp-lock lever that positions the lever-lock aperture concentrically with the jaw-lock aperture at a design position of travel of the clamp-lock lever for maintaining the clamp-lock lever and the outside-jaw step in a fixed pivotal relationship with the lock pin inserted in the lever-lock aperture and in the jaw-lock aperture.

3. A golf-car-security apparatus as described in claim 2 wherein:

the lock pin is a padlock shackle which the lever-lock aperture and the jaw-lock aperture are sized and shaped to receive.

4. A golf-car-security apparatus as described in claim 2 wherein:

the outside clamp jaw and the inside clamp jaw are rigid plates.

5. A golf-car-security apparatus as described in claim 4 wherein:

the clamp-lock lever has two juxtaposed plates extended from a handle section of the handle end to the clamp end of the clamp-lock lever;

ends of the outside clamp jaw and an end of the inside clamp jaw are positioned pivotally between the two juxtaposed plates;

the outside clamp jaw is attached pivotally to the clamp-lock lever with an axle that is riveted to the two juxtaposed plates and extended in rotational contact through an outside-jaw-axle orifice in the outside clamp jaw; and the inside clamp jaw is attached pivotally to the clamp-lock lever with an axle that is riveted to the two juxtaposed plates and extended in rotational contact through an inside-jaw-axle orifice in the inside clamp jaw.

6. A golf-car-security apparatus as described in claim 5 wherein:

the outside-jaw step is a bottom step; and the inside-jaw step is a top step superimposed on the bottom step in locked mode of the wheel-lock clamp.

7. A golf-car-security apparatus as described in claim 1 wherein:

the seat restraint is a rigid bar; and the seat-back attachment is a bifurcated extension of the rigid bar.

8. A golf-car-security apparatus as described in claim 7 wherein:

the seat restraint is attachable pivotally to the steering-wheel attachment.

9. A golf-car-security apparatus as described in claim 7 wherein:

the bifurcated extension of the rigid bar is designed to fit with desired snugness on opposite sides of an upright member on which a seat back is positioned.

10. A golf-car-security apparatus as described in claim 1 wherein:

the steering-wheel-attachment means is a bifurcated rod that is positionable diametrically on a steering wheel;

a steering-wheel hook is extended laterally from a side of a top end of the bifurcated rod and designed to fit snugly onto a circumferential portion of the steering wheel;

a spoke bifurcation is extended laterally from a side of a bottom end of the bifurcated rod and designed to fit snugly onto opposite sides of a steering-wheel spoke;

padlock apertures in the spoke bifurcation are positioned to receive a padlock shackle on an opposite side of the steering-wheel spoke from the bifurcated rod; and the steering-wheel attachment is extended rigidly from the steering-wheel-attachment means and attached pivotally to the seat restraint.

11. A golf-car-security apparatus as described in claim 1 wherein:

the steering-wheel-attachment means is a clamp rod that is positionable diametrically on a steering wheel;

a steering-wheel hook is extended laterally from a side of a top end of the clamp rod and designed to fit snugly onto a circumferential portion of the steering wheel;

a steering-wheel clamp is extended pivotally from a side of a bottom end of the clamp rod and designed to fit snugly onto a circumferential portion of the steering wheel at a position diametrically opposite from the steering-wheel hook;

at least one padlock aperture in the steering-wheel clamp is positioned in the steering-wheel clamp for concentric alignment with at least one padlock aperture in the clamp rod with the steering-wheel clamp positioned on the steering wheel; and the steering-wheel attachment is extended rigidly from the steering-wheel-attachment means and attached pivotally to the seat restraint.

12. A golf-car-security apparatus as described in claim 1 wherein:

the steering-wheel-attachment means is a telescopic rod that is positionable diametrically on a steering wheel;

a top steering-wheel hook is extended laterally from a side of a top section of the telescopic rod and designed to fit snugly onto a circumferential portion of the steering wheel;

a bottom steering-wheel hook is extended laterally from a side of a bottom section of the telescopic rod and designed to fit snugly onto a circumferential portion of the steering wheel at a position diametrically opposite from the top steering-wheel hook; and a telescope-positioning lock in locking relationship between the top section of the telescopic rod and the bottom section of the telescopic rod.

13. A golf-car-security apparatus as described in claim 12 wherein:

the steering-wheel attachment is extended rigidly from the steering-wheel-attachment means and attached telescopically to the seat restraint.

14. A golf-car-security apparatus comprising:

a seat restraint that is positionable on top of a seat of a golf car for preventing the seat from being removed for access to batteries and other items under the seat of the golf car;

a seat-back attachment on an aft portion of the seat restraint for engaging a portion of a seat back of a golf cart;

a steering-wheel attachment that is attachable to a front portion of the seat restraint;

a steering-wheel-attachment means with which the steering-wheel attachment is attachable to a steering wheel of the golf car; and a locking means with which the steering-wheel attachment is lockable onto the steering wheel of the golf car.

15. A golf-car-security apparatus as described in claim 14 wherein:

the seat restraint is a rigid bar; and the seat-back attachment is a bifurcated extension of the rigid bar.

16. A golf-car-security apparatus as described in claim 15 wherein:

the seat restraint is attachable pivotally to the steering-wheel attachment.

17. A golf-car-security apparatus as described in claim 15 wherein:

the bifurcated extension of the rigid bar is designed to fit with desired snugness on opposite sides of an upright member on which a seat back is positioned.

18. A golf-car-security apparatus as described in claim 15 wherein:

the bifurcated extension of the rigid bar is designed to fit with desired snugness on opposite sides of a seat back.

19. A golf-car-security apparatus as described in claim 15 wherein:

the steering-wheel-attachment means is a telescopic rod that is positionable diametrically on a steering wheel;

a top steering-wheel hook is extended laterally from a side of a top section of the telescopic rod and designed to fit snugly onto a circumferential portion of the steering wheel;

a bottom steering-wheel hook is extended laterally from a side of a bottom section of the telescopic rod and designed to fit snugly onto a circumferential portion of the steering wheel at a position diametrically opposite from the top steering-wheel hook; and a telescope-positioning lock in locking relationship between the top section of the telescopic rod and the bottom section of the telescopic rod.

20. A golf-car-security apparatus as described in claim 19 wherein:

the steering-wheel attachment is extended rigidly from the steering-wheel-attachment means and attached telescopically to the seat restraint.

21. A golf-car-security apparatus as described in claim 20 and further comprising:

a back-rest support having positional apertures through which the bifurcated extension of the rigid bar is extended for positioning the back-rest support intermediate a bifurcation of the bifurcated extension and a seat-back support.

22. A golf-car-security apparatus as described in claim 14 wherein:

the steering-wheel-attachment means is a bifurcated rod that is positionable diametrically on a steering wheel;

a steering-wheel hook is extended laterally from a side of a top end of the bifurcated rod and designed to fit snugly onto a circumferential portion of the steering wheel;

a spoke bifurcation is extended laterally from a side of a bottom end of the bifurcated rod and designed to fit snugly onto opposite sides of a steering-wheel spoke;

padlock apertures in the spoke bifurcation are positioned to receive a padlock shackle on an opposite side of the steering-wheel spoke from the bifurcated rod; and the steering-wheel attachment is extended rigidly from the steering-wheel-attachment means and attached pivotally to the seat restraint.

23. A golf-car-security apparatus as described in claim 14 wherein:

the steering-wheel-attachment means is a clamp rod that is positionable diametrically on a steering wheel;

a steering-wheel hook is extended laterally from a side of a top end of the clamp rod and designed to fit snugly onto a circumferential portion of the steering wheel;

a steering-wheel clamp is extended pivotally from a side of a bottom end of the clamp rod and designed to fit snugly onto a circumferential portion of the steering wheel at a position diametrically opposite from the steering-wheel hook;

at least one padlock aperture in the steering-wheel clamp is positioned in the steering-wheel clamp for concentric alignment with at least one padlock aperture in the clamp rod with the steering-wheel clamp positioned on the steering wheel; and the steering-wheel attachment is extended rigidly from the steering-wheel-attachment means and attached pivotally to the seat restraint.

24. A golf-car-security apparatus as described in claim 14 and further comprising a wheel-lock cramp having:

an outside clamp jaw with an outside-jaw step and an outside end;

an inside clamp jaw with an inside-jaw step and outside end;

an outside clamp hook extended from the outside end of the outside clamp jaw with which the wheel-lock clamp is attached to an underside of an outside rim extension of a wheel rim at a select circumferential position on a tire mounted on the wheel rim;

an inside clamp hook extended from the outside end of the inside clamp jaw with which the wheel-lock clamp is attached to an underside of an inside rim extension of a wheel rim at the select circumferential position on a tire mounted on the wheel rim;

a clamp-lock lever having a clamp end of the clamp-lock lever and a handle end of the clamp-lock lever;

the clamp end of the clamp-lock lever is attached pivotally to an inside end of the outside-jaw step at an inside pivotal position on the inside end of the outside-jaw step;

the clamp end of the clamp-lock lever is attached pivotally to an inside end of the inside-jaw step at an outside pivotal position on the inside end of the inside-jaw step;

a jaw-lock aperture sized and shaped to receive a lock pin is provided at a design distance from the inside pivotal position on the inside end of the outside-jaw step; and a lever-lock aperture sized and shaped to receive the lock pin is provided at a distance from the clamp end of the clamp-lock lever that positions the lever-lock aperture concentrically with the jaw-lock aperture at a design position of travel of the clamp-lock lever for maintaining the clamp-lock lever and the outside-jaw step in a fixed pivotal relationship with the lock pin inserted in the lever-lock aperture and in the jaw-lock aperture.

25. A golf-car-security apparatus as described in claim 24 wherein:

the lock pin is a padlock shackle which the lever-lock aperture and the jaw-lock aperture are sized and shaped to receive.

26. A golf-car-security apparatus as described in claim 24 wherein:

the outside clamp jaw and the inside clamp jaw are rigid plates.

27. A golf-car-security apparatus as described in claim 26 wherein:

the clamp-lock lever has two juxtaposed plates extended from a handle section of the handle end to the clamp end of the clamp-lock lever;

ends of the outside clamp jaw and an end of the inside clamp jaw are positioned pivotally between the two juxtaposed plates;

the outside clamp jaw is attached pivotally to the clamp-lock lever with an axle that is riveted to the two juxtaposed plates and extended in rotational contact through an outside-jaw-axle orifice in the outside clamp jaw; and the inside clamp jaw is attached pivotally to the clamp-lock lever with an axle that is riveted to the two juxtaposed plates and extended in rotational contact through an inside-jaw-axle orifice in the inside clamp jaw.

28. A golf-car-security apparatus as described in claim 27 wherein:

the outside-jaw step is a bottom step; and the inside-jaw step is a top step superimposed on the bottom step in locked mode of the wheel-lock clamp.

29. A golf-car-security apparatus comprising a wheel-lock clamp having:

an outside clamp jaw with an outside-jaw step and an outside end;

an inside clamp jaw with an inside-jaw step and outside end;

an outside clamp hook extended from the outside end of the outside clamp jaw with which the wheel-lock clamp is attached to an underside of an outside rim extension of a wheel rim at a select circumferential position on a tire mounted on the wheel rim;

an inside clamp hook extended from the outside end of the inside clamp jaw with which the wheel-lock clamp is attached to an underside of an inside rim extension of a wheel rim at the select circumferential position on a tire mounted on the wheel rim;

a clamp-lock lever having a clamp end of the clamp-lock lever and a handle end of the clamp-lock lever;

the clamp end of the clamp-lock lever is attached pivotally to an inside end of the outside-jaw step at an inside pivotal position on the inside end of the outside-jaw step;

the clamp end of the clamp-lock lever is attached pivotally to an inside end of the inside-jaw step at an outside pivotal position on the inside end of the inside-jaw step;

a jaw-lock aperture sized and shaped to receive a lock pin is provided at a design distance from the inside pivotal position on the inside end of the outside-jaw step; and a lever-lock aperture sized and shaped to receive the lock pin is provided at a distance from the clamp end of the clamp-lock lever that positions the lever-lock aperture concentrically with the jaw-lock aperture at a design position of travel of the clamp-lock lever for maintaining the clamp-lock lever and the outside-jaw step in a fixed pivotal relationship with the lock pin inserted in the lever-lock aperture and in the jaw-lock aperture.

30. A golf-car-security apparatus as described in claim 29 wherein:

the lock pin is a padlock shackle which the lever-lock aperture and the jaw-lock aperture are sized and shaped to receive.

31. A golf-car-security apparatus as described in claim 29 wherein:

the outside clamp jaw and the inside clamp jaw are rigid plates.

32. A golf-car-security apparatus as described in claim 31 wherein:

the clamp-lock lever has two juxtaposed plates extended from a handle section of the handle end to the clamp end of the clamp-lock lever;

ends of the outside clamp jaw and an end of the inside clamp jaw are positioned pivotally between the two juxtaposed plates;

the outside clamp jaw is attached pivotally to the clamp-lock lever with an axle that is riveted to the two juxtaposed plates and extended in rotational contact through an outside-jaw-axle orifice in the outside clamp jaw; and the inside clamp jaw is attached pivotally to the clamp-lock lever with an axle that is riveted to the two juxtaposed plates and extended in rotational contact through an inside-jaw-axle orifice in the inside clamp jaw.

33. A golf-car-security apparatus as described in claim 32 wherein:

the outside-jaw step is a bottom step; and the inside-jaw step is a top step superimposed on the bottom step in locked mode of the wheel-lock clamp.

* * * * *